(12) United States Patent
Ben-Horin (10) Patent No.: US 7,581,649 B2
(45) Date of Patent: Sep. 1, 2009

(54) REVERSE FLOW SPIN-CLEANING LIQUID FILTERS

(75) Inventor: Raanan Ben-Horin, Kibbutz Beit-Zera (IL)

(73) Assignee: Arkal Filtration Systems C.S. Ltd., Biet-Zera (IL)

( * ) Notice: Subject to any disclaimer, the term of this patent is extended or adjusted under 35 U.S.C. 154(b) by 66 days.

(21) Appl. No.: 10/573,061

(22) PCT Filed: Sep. 19, 2004

(86) PCT No.: PCT/IL2004/000862

§ 371 (c)(1),
(2), (4) Date: Mar. 21, 2006

(87) PCT Pub. No.: WO2005/028071

PCT Pub. Date: Mar. 31, 2005

(65) Prior Publication Data
US 2007/0029249 A1 Feb. 8, 2007

(30) Foreign Application Priority Data
Sep. 22, 2003 (IL) ........................... 158052

(51) Int. Cl.
*B01D 29/11* (2006.01)
*B01D 29/46* (2006.01)
*B01D 29/44* (2006.01)

(52) U.S. Cl. ............. 210/411; 210/413; 210/488; 210/352; 210/136; 210/354; 285/354; 285/387

(58) Field of Classification Search ........... 210/411, 210/488, 413
See application file for complete search history.

(56) References Cited

U.S. PATENT DOCUMENTS

| | | | | |
|---|---|---|---|---|
| 3,515,415 A * | 6/1970 | Hetzel et al. | ............. | 285/354 |
| 4,655,910 A * | 4/1987 | Tabor | ............. | 210/107 |
| 6,398,037 B1 * | 6/2002 | Sadan et al. | ............. | 210/352 |
| 6,419,826 B1 * | 7/2002 | Lara et al. | ............. | 210/304 |

FOREIGN PATENT DOCUMENTS

GB   1 316 324   5/1973

OTHER PUBLICATIONS

Erik Orberg et al., "26th Edition Machinery's Handbook," pub. Industrial Press Inc., New York, 2000. Of particular relevance is the example shown, starting on p. 300.*

* cited by examiner

*Primary Examiner*—Walter D Griffin
*Assistant Examiner*—Denise R Anderson
(74) *Attorney, Agent, or Firm*—Blakely, Sokoloff, Taylor & Zafman LLP (57) ABSTRACT

In a liquid filter of the reverse-flow flush-cleaning type, the present invention provides the improvement of mounting the pack of discs (170) intermediate to an assembly including a seat member (200) and screw-thread split-ring (202).

5 Claims, 7 Drawing Sheets

REVERSE FLOW SPIN-CLEANING LIQUID FILTERS

The present application is a non-provisional application of International Application No. PCT/IL2004/000862, filed Sep. 19, 2004.

BACKGROUND OF THE INVENTION

The present invention relates to liquid filters, particularly for water irrigation systems, however also useful for other industrial or domestic applications.

More specifically, the invention concerns filter devices of the type disclosed in our U.S. Pat. No. 6,398,037 issued Jun. 4, 2002 which is hereby incorporated by reference (hereinafter called "the Patent").

The Patent relates to filter devices utilizing a battery of filter discs with reverse flushing water flow cycles wherein the discs were caused to spin under the impact of water jets impinging thereon (hereinafter referred to as "Spin-Clean Filters").

Figure 1:
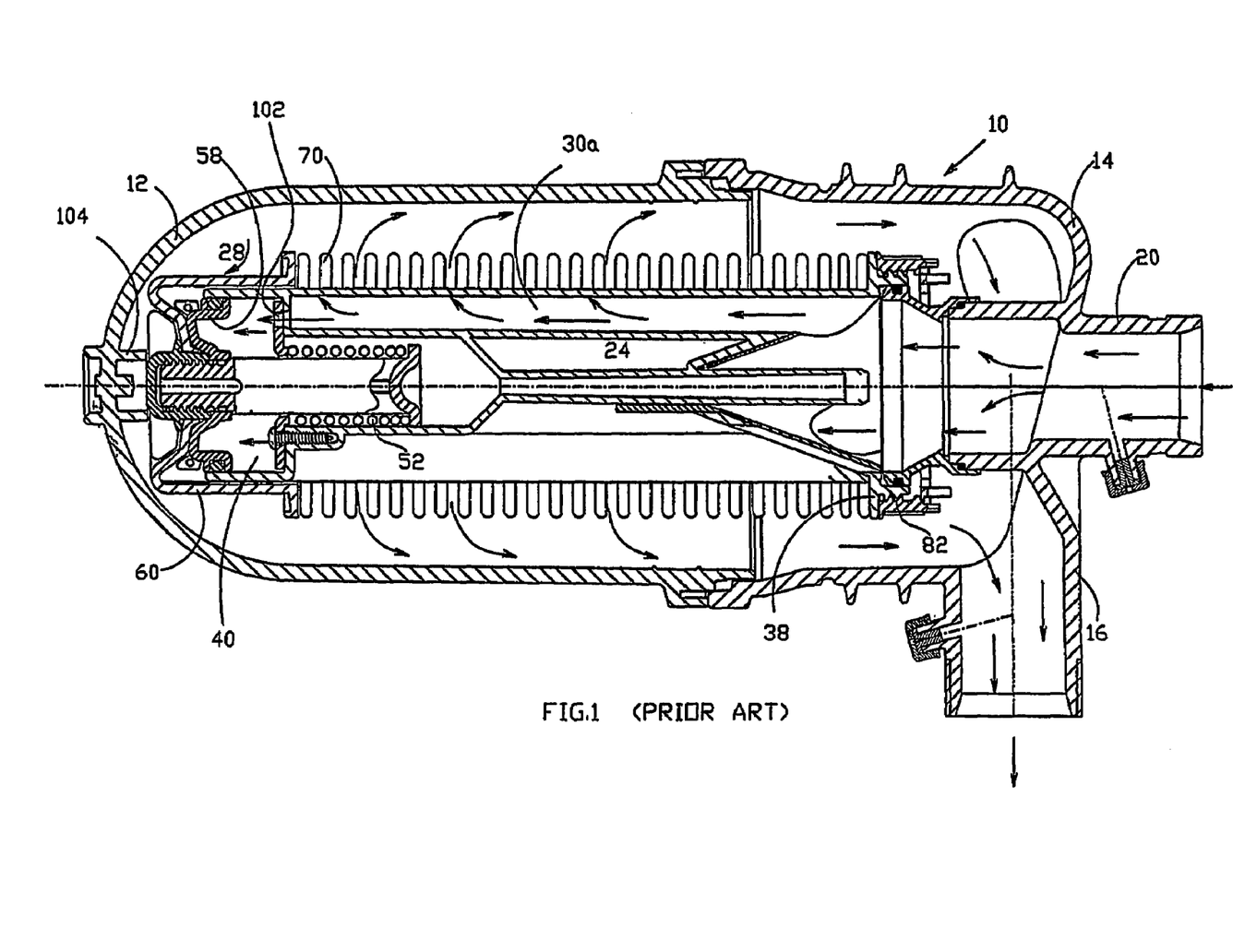
FIG. 1 is a longitudinal cross-sectional view of the filter device of the Patent in reverse flush flow, spin-cleaning mode of operation.

For better understanding of the invention herein disclosed, reference shall be made to FIG. 1 which depicts the reverse flow spin-cleaning stage of the filter device (conforming FIG. 10 of the Patent except that the spin-cleaning stage is provoked by the reverse flow proper rather than by an external pressure command, a feature which is understood to be encompassed within the scope of the Patent).

Using the same reference numerals as in the Patent, the water (or other liquid) admitted through the outlet port 20 flows into the conduit 30a (and conduits 30b and 30c that are not shown) and, through an opening 102a (not existing in the Patent exemplified embodiment) into the cylinder space 40 of the cylinder-and-piston assembly 28. Under a pressure sufficient to overcome the force of the spring 52, the piston 58 along with the cap member 60 will slide towards the distal end of the filter 10, relieving the clamping of the filter discs battery 70. The stroke of piston 58 is delimited by a protrusion 104 formed at the housing member 12 (shown but not referenced in the Patent drawings). As will be explained later on, this need for an extra, exterior element for stopping the progress of the piston has been found disadvantageous and hence remedied by one aspect of the present invention.

Turning now to the proximal end of the filter device 10, there has been used a female screw-threaded ring portion 38 of the fixed member against which the filter discs are pressed for mounting the integral main filter core member 24 to the filter housing structure 14 intermediate female screw-threaded ring 82. This mounting or coupling arrangement has also been found worthy of improvement as will be explained in detail below.

SUMMARY OF THE INVENTION

Thus provided according to one aspect of the invention is a liquid filtering device, particularly for irrigation water installations comprising a cylindrical housing with an inlet port and an outlet port; a cylindrical filter member installed within the housing so that, water flowing from the inlet port to the outlet port enters the filter member in a radial direction, and is discharged through the outlet port, and vice-versa during reversed, filter flushing flow cycles; a core member centrally mounted within the cylindrical space defined by, and forming a support for, the filter member; a fixed member abutting against the filter member at one axial end thereof; a piston assembly mounted to the core member comprising a piston and a displaceable member coupled to the piston and abutting against the filter member at the other axial side thereof; wherein said mounting of the core member comprises a female screw-thread forming part of the said fixed member; a female screw-threaded split ring matching the female screw-thread; and a circular convergent cone shaped trough encompassing the ring fixedly mounted to said housing; the arrangement being such that upon threading together, the ring becomes attracted towards the fixed member and thus self-tightened by frictionally clamping within the cone-shaped trough.

According to another aspect of the invention, the piston assembly is provided with means for limiting the progress amount of the piston, such as a coil spring, the number and size of the coils being designed so as to limit the stroke of the piston following a predetermined compression thereof.

BRIEF DESCRIPTION OF THE DRAWINGS

These and additional constructional features and advantages of the present invention will become more clearly understood in light of the ensuing description of a preferred embodiment thereof, given by way of example only, with reference to the accompanying drawings, wherein.

DETAILED DESCRIPTION OF THE PREFERRED EMBODIMENT

Figure 2:
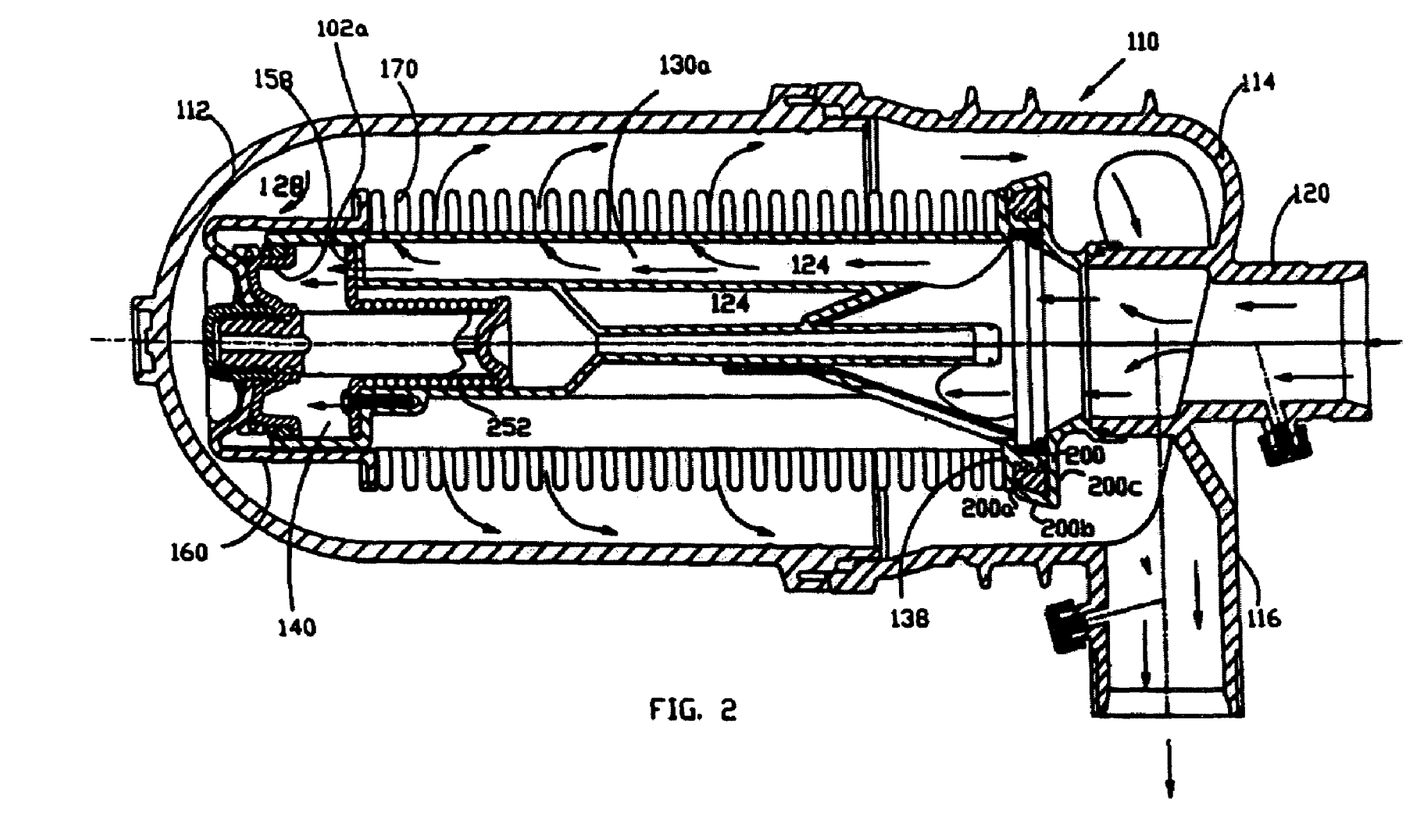
FIG. 2 is a cross-sectional view of a filter device incorporating the improvements of the preset invention.

As clearly seen in FIG. 2, the mounting of the filtering discs battery 170 to the inlet/outlet housing member 114 has been modified. Rather than female screw-threaded ring 82 (FIG. 1) there is provided an assembly comprised of seat member 200 and screw-threaded split-ring 202 shown in more detail in FIGS. 3-7.

Figure 4:
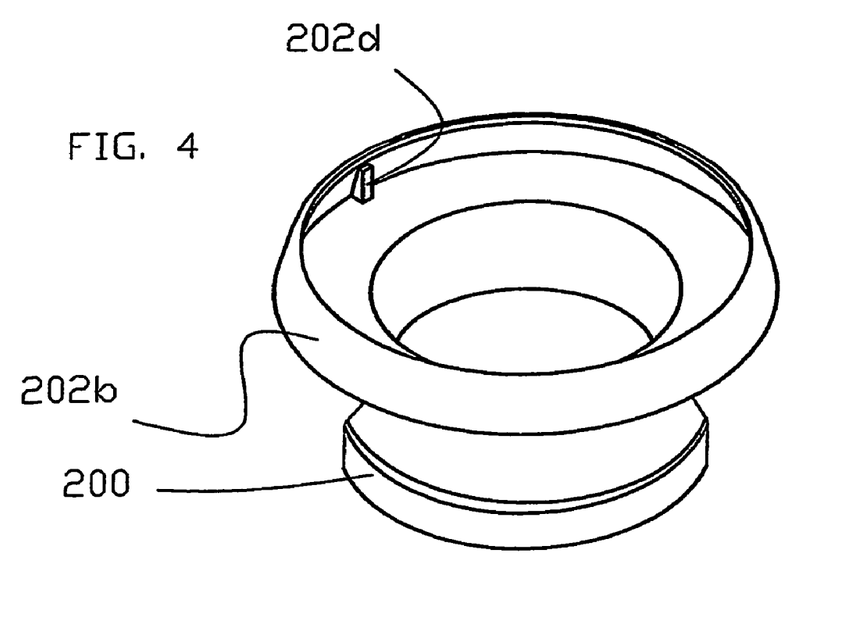
FIG. 4 shows the seat member of the split-ring.
Figure 5:
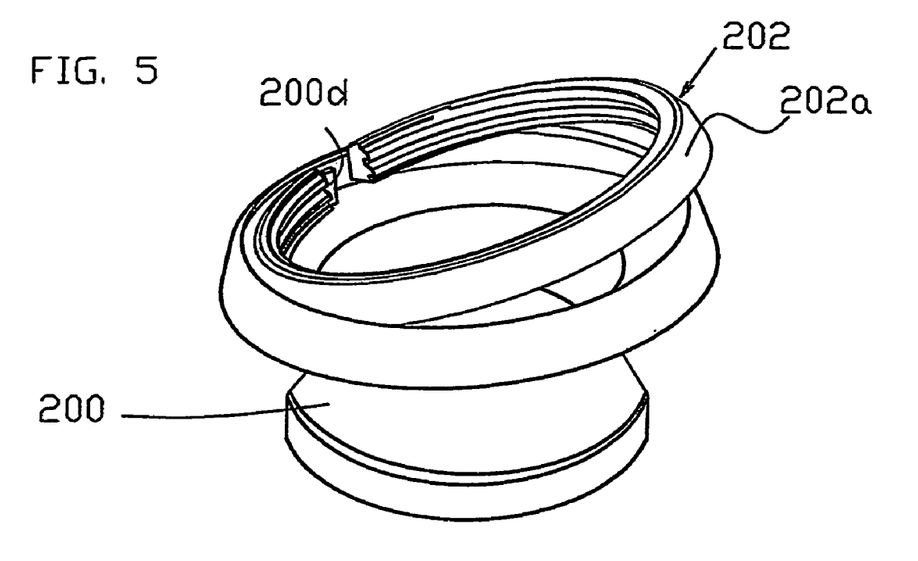
FIG. 5 shows the split-ring in the preparatory state for insertion into the seat member.
Figure 6:
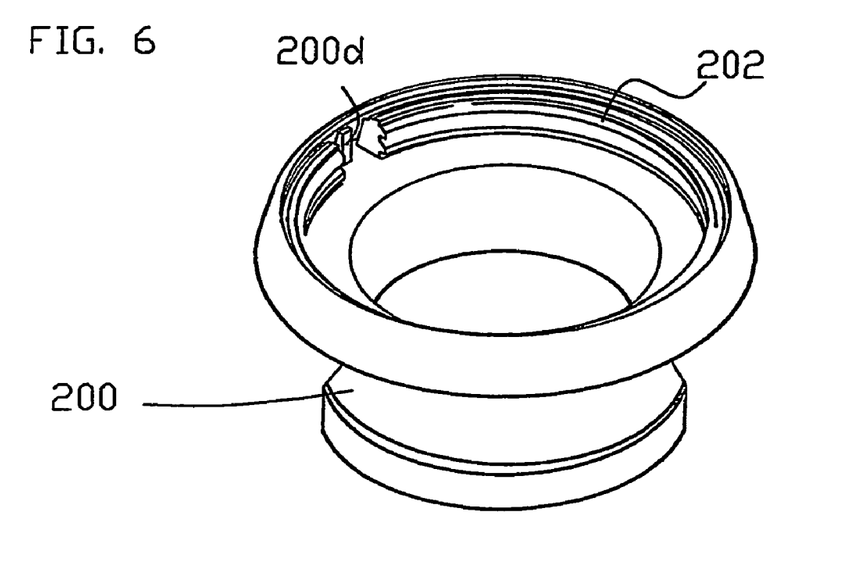
FIG. 6 shows the assembled state of the split-ring.

The seat member 200 is formed with a circular trough portion defined by circular rim 200a, convergent cone-shaped wall 200b and planar radial wall 200c.

The seat member 200 is shown as integrally formed with the outlet fitting but other variations may be employed such as by welding.

The ring 202 is split as shown and made of an elastic or springy material to allow its closing by force (FIG. 5) into a reduced diameter which must be smaller than the opening defined by the rim 200a.

Figure 3:
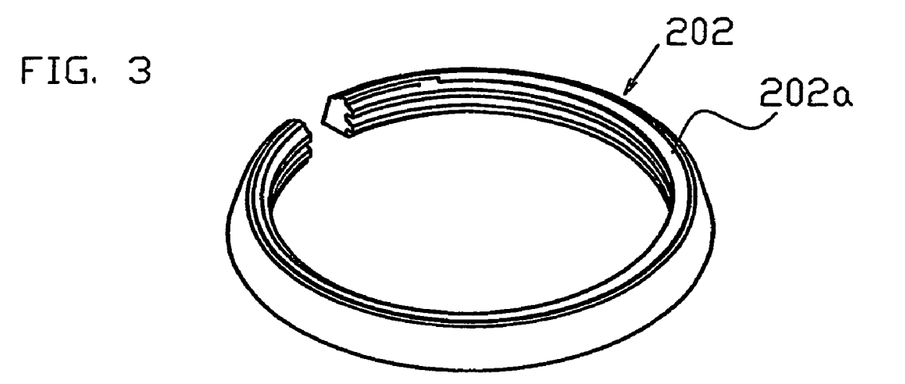
FIG. 3 shows the split-ring before assembly.

The outer surface 202a of the ring 202 is beveled by the same angle as the seat cone wall 200b. The inner side is provided with a screw-thread matching that of the core member ring 138.

The height of the ring 202 is less than the distance between the inner surfaces of the rim 200a and of the radial wall 200c.

Figure 7A:
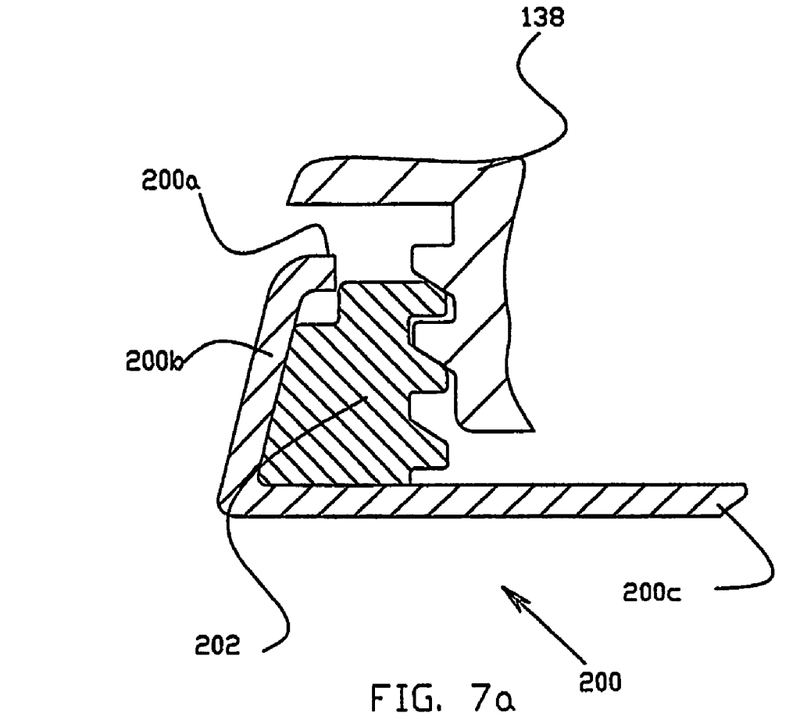
FIG. 7a is a partial cross-section showing the initial state of engagement of the core coupling ring and the split-ring.

The mounting of the core member 124 is perfected in the following manner. First, the split-ring 202 is inserted into the trough portion by forcing it to close and placing thereinside, whereupon the ring will resume its partially open state (FIG. 7*a*). It is designed so that in this position the screw threads of the ring 138 and of the split-ring 202 will match.

Figure 7B:
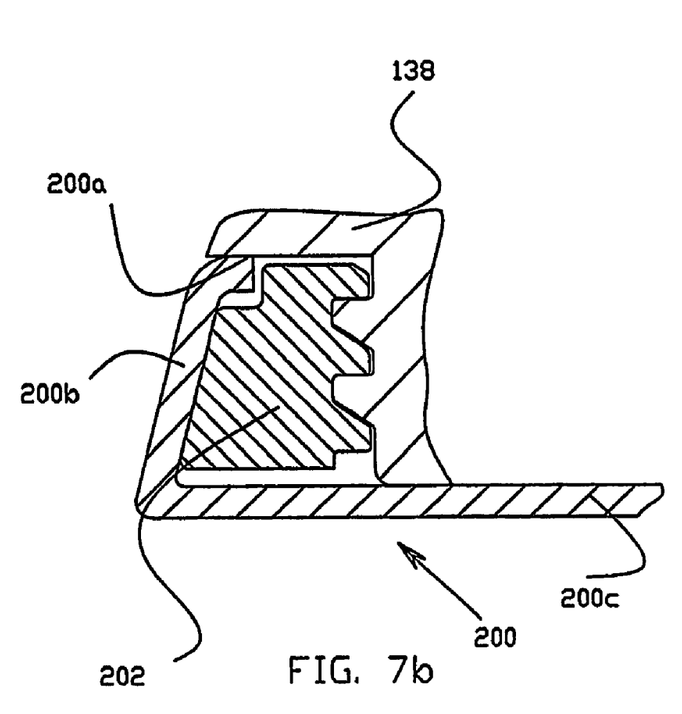
FIG. 7b shows the final state of engagement.

Upon relative rotation, the split-ring becomes dragged along the cone-shaped wall 200*b* up to a certain point (FIG. 7*b*). Consequently, a self-tightening effect occurs whereby a highly secured and sealed coupling of the threaded members to each other is attained in a more effective way than in the Patent construction (FIG. 1).

If necessary, stop means such as projection 200*d* may be provided to avoid the unison rotation of the two parts, at-least at the beginning of the operation where the friction between the beveled ring portions 202*a* and the seat wall portion 200*b* might be insufficient.

The dismantling of the core member 124 from the seat member 200 for maintenance or replacement purposes follows in the reverse order.

Turning now to the distal side of the filter device 110, it will be readily seen that, by properly choosing the number and diameter of the coils, the spring 252 functions as an autonomic stop, limiting the stroke of the piston 158 (and cap member 160) of piston assembly 128.

This seemingly minor and even almost obvious modification presents, however, the advantage of completely dispensing with the stop cap (104—FIG. 1). Moreover, the length of the piston stroke can be governed and properly selected irrespectively of the housing(s) size.

This variability becomes even more significant where the filter devices are used in groups, either in parallel or in series.

Figure 8:
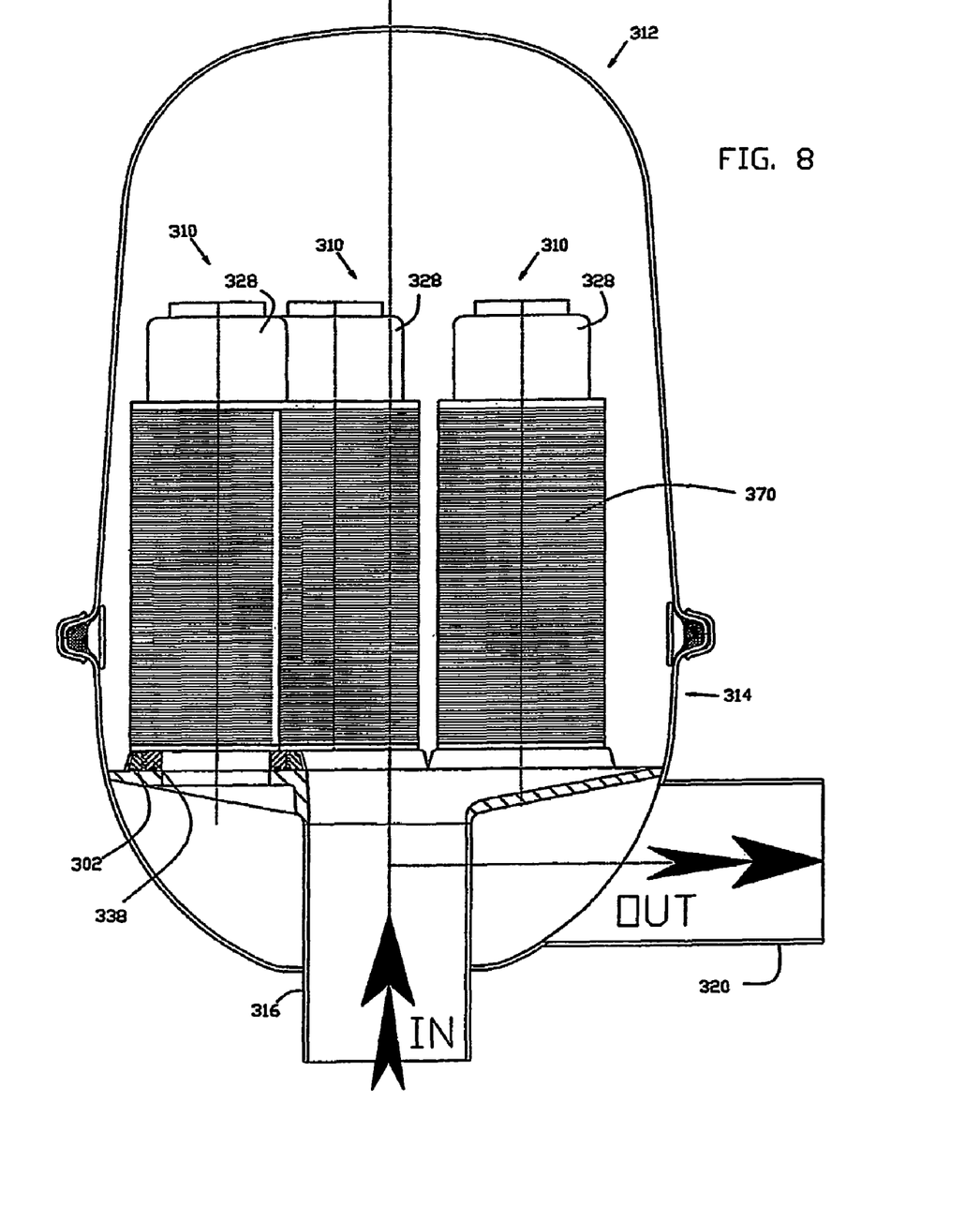
FIG. 8 is a schematic view of a group of filter devices installed in parallel.

In FIG. 8 a battery of five filter devices 310 is shown (only three are seen) operating in parallel. The filters are mounted on a common base formed in inlet/outlet housing member 314, either by the arrangement described above or otherwise.

Noteworthy in the present context is that the cylinder and piston assemblies 328 incorporate the integral piston-stroke limiting means rather than external stop-by-abutment means (cap 104 in FIG. 1). This entails a significant saving in the design and structure of the other housing member 312.

Figure 9:
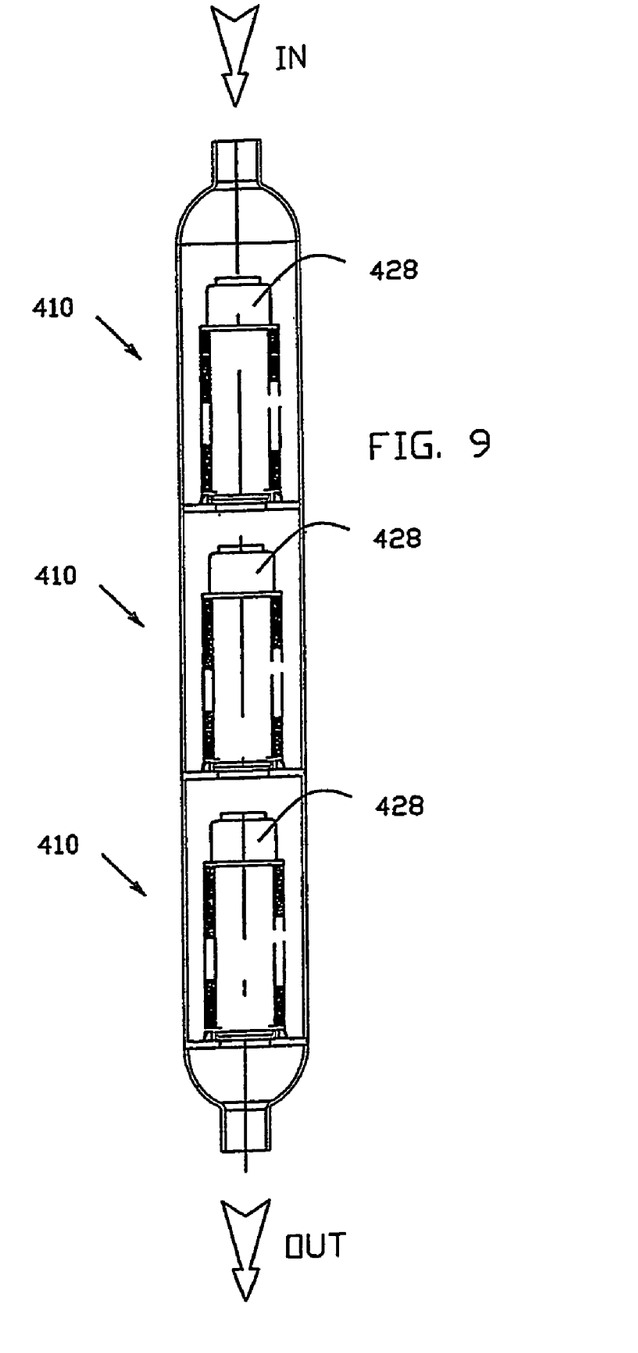
FIG. 9 is a schematic view of several filter devices installed in series.

The filter devices 410 of FIG. 9 operate in tandem between the common inlet and outlet, e.g. to achieve superfine quality of filtered liquid.

This type of construction is only enabled by implementation of the self-limiting piston-stroke means proposed according to the present invention.

Those skilled in the art to which this invention pertains will readily appreciate that numerous changes, variations and modifications can be effected without departing from the true spirit and scope of the invention as defined in and by the appended claims.

What is claimed is:

1. A liquid filtering device, particularly for irrigation water installations comprising:
    a housing with an inlet port and an outlet port;
    a core member centrally mounted within the housing comprising at one axial end thereof an abutment ring associated with a male screw-thread for mounting the core member to the housing next to and in communication with the inlet port;
    a discs-type filter member supported by the core-member so that water flowing from the inlet port enters the filter member in a radial direction, and is discharged through the outlet port, and vice-versa during reversed, filter flushing flow cycles;
    a piston assembly mounted to the core member comprising a piston and a displaceable member coupled to the piston and abutting against the filter member at the other axial side thereof; and
    wherein an assembly for the mounting of the core member comprises a seat member and a female screw-threaded split ring matching the male screw-thread of the abutment ring; and the seat member is formed with a circular convergent cone shaped trough defined by a circular rim, a convergent cone-shaped wall, and a planar radial wall, the seat member encompassing the split ring and fixedly mounted to the housing, the arrangement being such that upon threading together, the split ring is dragged along the coned-shaped wall and attracted towards the abutment ring, distal from the planar radial wall, and the outer surface of the split ring is beveled by a same angle as the cone-shaped wall and thus becomes self-tightened against the cone-shaped wall of the seat member to provide a secure and sealed coupling between treads of the split ring and the abutment ring,
    wherein said seat member is open at-least one side thereof allowing the split ring to be inserted thereinto by elastically squeezing same into a smaller diameter to initially force the split ring against the planar radial wall.

2. The device as claimed in claim 1, wherein said trough is integrally formed with a fitting communicating the core member with the inlet port of the filter member.

3. The device as claimed in claim 2, wherein a stop is provided within the trough for avoiding free rotation of the split ring.

4. The device as claimed in claim 1, wherein the piston assembly is provided with means for limiting the progress amount of the piston.

5. The device as claimed in claim 4, wherein said means comprise a coil spring, the number and size of the coils being designed so as to limit the stroke of the piston following a predetermined compression thereof.

* * * * *

UNITED STATES PATENT AND TRADEMARK OFFICE
CERTIFICATE OF CORRECTION

PATENT NO. : 7,581,649 B2  Page 1 of 1
APPLICATION NO. : 10/573061
DATED : September 1, 2009
INVENTOR(S) : Ben-Horin It is certified that error appears in the above-identified patent and that said Letters Patent is hereby corrected as shown below:

On the title page, Item (*) Notice should read:

Subject to any disclaimer, the term of this patent is extended or adjusted under 35 U.S.C. 154(b) by 66 days.

In Column 4, Claim 1, line 35, after "open", insert -- at --

Signed and Sealed this

Third Day of August, 2010

David J. Kappos
*Director of the United States Patent and Trademark Office*